Nov. 23, 1943.  D. J. HILFERTY  2,334,704
AUTOMATIC PILOT
Filed July 24, 1941
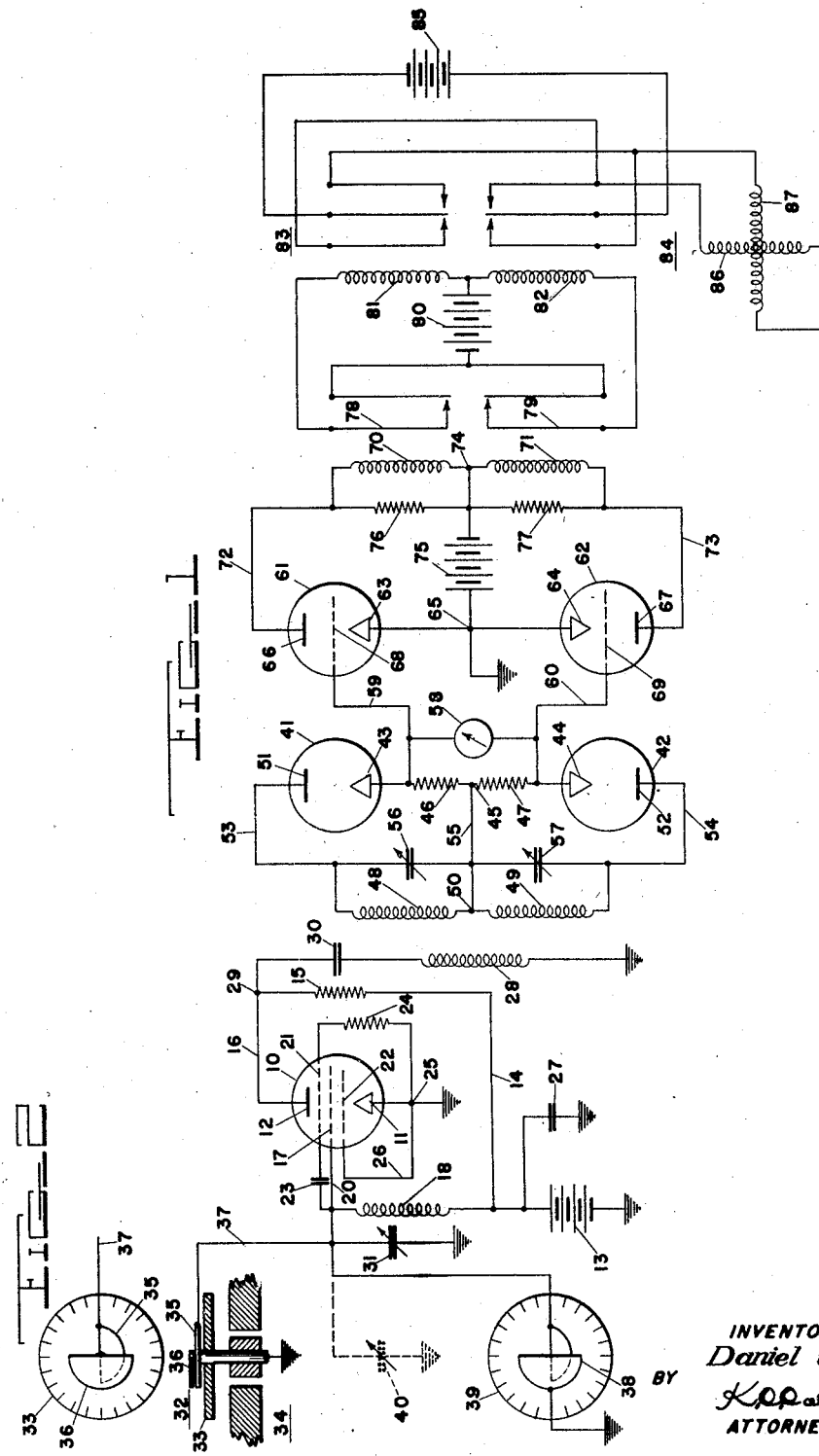
INVENTOR
*Daniel J. Hilferty*
BY
*K. D. Parling*
ATTORNEY Patented Nov. 23, 1943

2,334,704

UNITED STATES PATENT OFFICE 2,334,704

AUTOMATIC PILOT

Daniel J. Hilferty, Hyattsville, Md.

Application July 24, 1941, Serial No. 403,831

4 Claims. (Cl. 172—282)

(Granted under the act of March 3, 1883, as amended April 30, 1928; 370 O. G. 757)

This invention relates to a telemetric system and more particularly to an electrical apparatus for automatically indicating and/or controlling the heading of a craft.

It is an object of the present invention to provide a novel electrical arrangement for accurately indicating a variable value at one or at a plurality of remotely positioned points.

Another object is to provide a novel electrical arrangement for indicating a variable value at a single or at a plurality of remotely positioned points and for controlling operation of one or of a plurality of remotely positioned electrical machines in accordance with said variations.

Another object is to provide an electrical arrangement associated with a craft having novel means for automatically maintaining the craft on a fixed heading.

Another object is to provide an electrical arrangement for use with a craft having manually operable means for varying the heading of the craft and novel automatic means for maintaining the craft on a heading determined by the manually operable means.

Still another object of the present invention is to provide a telemetric system having an oscillation generator for producing an oscillating signal potential at a fixed frequency, an arrangement for varying the frequency of said oscillating signal potential in accordance with variations of the value to be measured, a receiver responsive to said frequency variation and novel means associated with the receiver for indicating said value as a function of said frequency variation and for controlling operation of an electrical device in accordance with said frequency variations.

Still another object is to provide in a telemetric system of the foregoing character a novel receiver comprising a bridge detector network having a plurality of circuits side tuned to different frequencies whereby the output potential of the network varies in accordance with frequency variation of an oscillating signal potential received thereby.

Still another object of the present invention is to provide a telemetric system for indicating and/or controlling the heading of a craft having an oscillation generator for producing an oscillating signal potential at a fixed frequency, a reactance operated by relative movement between a compass and the craft for varying the frequency of the oscillating signal potential in direct proportion to deviations of the craft from a normal heading, a novel receiver for said oscillating signal potential having means for varying the output thereof in accordance with said frequency variations, a device responsive to variations of the output potential of said receiver for maintaining the craft on a fixed heading, and novel manually operable means for varying the freqency of said oscillating signal potential to vary the heading of the craft.

Other objects and features of the invention will appear more fully from the following detailed description when taken with the accompanying drawing which discloses one embodiment of the invention. It is to be expressly understood, however, that the drawing is designed for purposes of illustration only and not as a definition of the limits of the invention, reference being had to the appended claims for the latter purpose.

In the drawing, wherein similar reference characters denote similar parts throughout several views:

Fig. 1 is a diagrammatic showing of an electrical arrangement embodying the principles of the present invention, and Fig. 2 is a plan view of an element disclosed in Fig. 1.

With reference more particularly to the drawing, an electrical arrangement, embodying the principles of the present invention, for indicating and/or controlling the heading of a craft is disclosed therein including a transmitter comprising an oscillation generator for producing an oscillating signal potential at constant frequency. The oscillation generator may be of any suitable type, and, as shown in the drawing, comprises a thermionic valve 10 of the pentode type having a cathode 11 heated in a conventional manner by means of a heater element not shown. Plate or anode 12 of the pentode 10 is supplied with a direct current potential from source 13 through lead 14, suitable resistance 15 and lead 16. A direct current potential from the source 13 is supplied to control grid 17 through inductance 18 and lead 20. The pentode 10 also includes suppressor grids 21 and 22, the former having one end thereof connected through a suitable condenser 23 to lead 20 and the other end being electrically connected through resistance 24 at point 25; the condenser 23 functions to prevent the flow of direct current to this path. Suppressor grid 22 is connected to point 25 through lead 26. Control grid-cathode alternating current flows from point 25 through a condenser 27 and inductance 18 to the control grid 17. The condenser 27 provides a path of low impedance for the alternating current around the source 13. Plate-cathode alternating current flows from point 25 through condenser 27 and resistance 15 to the plate 12, or from point 25 through a path including an inductance 28, the latter being connected to lead 16 at point 29. The aforementioned path including inductance 28 is provided for the output of the oscillation generator and a suitable condenser 30 is included therein for blocking out direct current thereto and for providing a path of low impedance for the oscillating signal potential.

The frequency of the oscillating signal potential of the oscillation generator may be obtained under wide limits by incorporating suitable reactance means in the generator. Such reactance means includes inductance 18 and variable capacitance 31, the latter connected in parallel relation with respect to the cathode and the plate of the pentode 10. By utilizing suitable inductance 18 and by properly tuning capacitance 31 the frequency of the oscillating signal potential may be obtained from audio frequencies to high radio frequencies; however, it is preferred that the reactance means be so selected and tuned that the frequency of the oscillating signal potential is in the order of kilocycles for a purpose that will appear more fully hereinafter.

As heretofore stated, the present invention provides means for varying the frequency of the oscillating signal potential throughout a small range upon deviation of the craft from a normal heading. As shown, such means includes a trimming device 32 mounted on a compass card 33 of a compass 34 positioned on the craft. As shown in Fig. 2, the trimming device 32 may take the form of a variable condenser comprising elements 35 and 36, the former element being connected to the oscillation generator through lead 37, while the latter is connected to the ground whereby the trimming device 32 is included in the generator in parallel relation with inductance 18 and capacitance 31. The condenser elements 35 and 36 are to be of straight line frequency type so that increments of deviation of the compass will produce equal increments of frequency variations of the oscillating signal potential. For a purpose that will appear more fully hereinafter a trimming device 38 positioned on a dummy compass card 39, constructed similar to the trimming device 32, is also connected in parallel relation with respect to conductance 18 and capacitance 31, as well as a variable condenser 40 indicated in broken lines on the drawing.

The present invention provides a novel receiver for the oscillating signal potential that is responsive to the frequency variations thereof and operates in such a manner that the output thereof varies in direct proportion to the frequency variations. As shown, the receiver comprises a bridge detector network including a pair of thermionic valves 41 and 42 of the diode type each respectively including a cathode 43 and 44 connected together at point 45 through suitable resistance 46 and 47. The bridge detector network further includes inductances 48 and 49 connected together at point 50 and coupled to inductance 28 of the oscillation generator thus forming a transformer in which conductances 48 and 49 comprise the secondary winding thereof. The other ends of inductances 48 and 49 are respectively connected to plates 51 and 52 of the diodes 41 and 42 through leads 53 and 54. The bridge circuit is completed through lead 55 which connects points 45 and 50. In order to tune the bridge detector network so that the same will be responsive to frequency variations of the oscillating signal potential, variable capacitances 56 and 57 are respectively shunted across inductances 48 and 49 in order that a frequency differential may be obtained between the currents inducted in each of the circuits of the bridge network. In such arrangement, one of the circuits is tuned to operate at a frequency a certain degree higher than the mean frequency of the oscillating signal potential, while the other circuit is tuned to a frequency a similar degree below the mean frequency, whereby, when an oscillating signal potential at the mean frequency is induced in the network, the output potential at cathodes 43 and 44 will be equal. Upon a change in the frequency of the oscillating signal potential, above or below the mean frequency, the output potential of one of the cathodes will increase while the output potential of the other cathode decreases in direct proportion to the frequency changes.

In order to indicate the heading of the craft or the deviation thereof from a fixed heading a suitable meter 58 is connected across output leads 59 and 60 of the bridge detector, leads 59 and 60 being respectively connected to cathodes 43 and 44. The meter 58 is responsive to the output potentials of the cathodes 43 and 44 and is adapted to indicate the potential difference therebetween. The meter may be calibrated in degrees, and any desired number thereof may be utilized and positioned at a plurality of remote points whereby an exact indication of the crafts heated may be obtained therefrom.

Means are also provided by the present invention for controlling the heading of a craft by utilizing the novel electrical arrangement described heretofore. Such means as shown in the drawing includes a pair of vacuum tubes 61 and 62 of the triode type, each including a cathode 63 and 64 connected together at point 65. Each of the triodes also respectively includes plates or anodes 66 and 67 and a control grid 68 and 69. The control grids are respectively connected to output leads 59 and 60 of the bridge detector network and the bias thereof varies in accordance with the output potential variations of the cathodes 43 and 44 to thus control the flow of plate current through each of the triodes in direct proportion to the frequency variations of the oscillating signal potential.

It will be apparent that variations of plate current of the triode 61 and 62 may be readily utilized for operating various electrical machines which in turn could control the heading of a craft. In the present instance a direct current installation is disclosed; however, it is to be expressly understood that an alternating current circuit including a phase-shifted network responsive to variations of plate current of the triode 61 and 62 could be readily employed. As shown, a relay system is included in the plate circuits of each of the vacuum tubes 61 and 62 which comprises inductances 70 and 71 each having one end thereof connected respectively to plates 66 and 67 through leads 72 and 73. The other ends are connected together at point 74, and this point is connected through a source of direct current 75 to point 65. A pair of resistances 76 and 77 are respectively shunted across inductances 70 and 71 for controlling the operation of relay members 78 and 79 in accordance with certain values of the plate currents. As heretofore stated, the oscillation generator is tuned in such a manner that the frequency of the oscillating signal potential is in the order of kilocycles. Such a procedure is followed in order to reduce the time between plate current variations of the vacuum tubes 61 and 62, upon a frequency variation of the oscillating signal potential, and subsequent operation of relay members 78 or 79 to a minimum. Operation of relay members 78 and 79 controls flow of current from source 80 to one or the other of relays 81 and 82 for operating a pair of switching devices 83 and 84 in order to control direction of current flow from source 85 through windings 86 and 87 of an electrical machine, not shown, which may control the heading of a craft.

In operation of the novel electrical apparatus described heretofore, inductance 18 and capacitance 31 are tuned in such a manner that the oscillating signal potential output of the oscillation generator is of a frequency in the order of kilocycles. Capacitances 56 and 57 of the bridge detector network are tuned to provide a frequency differential between the currents in each of the circuits and to provide equal output potential at leads 59 and 60 at the mean frequency. With the apparatus tuned in the foregoing manner, the bias of grids 68 and 69 will be equal and therefore the plate currents of each of the vacuum tubes 61 and 62 will also be equal and of such value that switch members 78 and 79 will be in an inoperative position.

When the craft deviates from its heading, relative rotation occurs between elements 35 and 36 of the trimming device 32 which causes an increase or decrease of the frequency of the oscillating signal potential produced by the oscillation generator. The direction of deviation from the normal heading will determine whether the frequency of the oscillating signal potential will increase or decrease with respect to the constant or mean frequency thereof. When the frequency of the oscillating signal potential increases above the mean frequency the output potential of one of the diodes increases, while the output of the other decreases, thereby increasing the bias of one of the control grids of either of the vacuum tubes 61 and 62 while decreasing the bias of the other. The increased bias of one of the grids 68 or 69 results in an increase of plate current output from the respective tube whereby one of the other of switch members 78 or 79 will be operated to cause operation of either relay 81 or 82. One or the other of switch devices 83 and 84 will then be affected to allow the flow of current from source 85 through the windings 86 and 87 of the electrical machine in a certain direction to cause proper rotation of the machine whereby the craft is directed to its proper heading. As the craft again approaches its proper heading the trimming device 32 is moved to its original position in which the frequency of the oscillating signal potential is at the mean or constant value. Throughout the foregoing operations the meter 58 is effective to give a direct instantaneous indication of the position of the craft. When the craft deviates from its course in such a direction to cause the frequency of the oscillating signal potential to drop below the mean frequency the apparatus will operate in a manner similar to the above description with the exception of opposite elements therein will be effective to reverse the direction of current flow through the windings 86 and 87 thus causing rotating of the electrical machine in the opposite direction.

When it is desired to set a predetermined course, the dummy compass card 39 is moved to a position to indicate such course. The frequency of the oscillating signal potential is thereby affected which in turn affects the bridge detector network and the desired course is indicated by the meter 58. Switching device 83 or 84 operates to control the direction of rotation as the electrical machine, not shown, to bring the craft to the desired heading. When the craft reaches the heading set on the dummy card 39 the trimming device 32 is effective to vary the frequency of the oscillating signal potential until the mean frequency value is obtained, thus maintaining the craft on a desired course determined by the position of the dummy compass card 39. When the dummy compass card 39 is not included in the system, the variable capacitance 40 may be used for setting a desired course, such course would be readily observed on the meter 28.

The present invention thus provides a novel electrical arrangement for instantly and accurately indicating the value of a variable element at one or at a plurality of remote points, and for controlling operation of one or of a plurality of remotely positioned electrical machines in accordance with said variations. The electrical arrangement is of such character that the same may be utilized in connection with a craft for automatically indicating and/or controlling the heading thereof.

Although only one embodiment of the invention has been disclosed and described in detail herein, it is to be expressly understood that various changes and substitutions may be made therein without departing from the spirit of the invention as well understood by one skilled in the art. Reference therefore to be had to the appended claims as a definition of the limits of the invention.

The invention described herein may be manufactured and used by or for the Government of the United States of America for governmental purposes without the payment of any royalties thereon or therefor.

What is claimed is:

1. In combination with a compass mounted on a craft, a compass card for said compass and means for controlling the heading of said craft, an oscillation generator for producing an oscillating signal potential at a constant frequency, means operated upon relative movement between the craft and said compass card for varying the frequency of said oscillating signal potential, a receiver for said oscillating signal potential responsive to said frequency variations, means associated in said receiver for indicating the heading of the craft as a function of said frequency variations, means associated with said receiver for operating said controlling means in accordance with said frequency variations to maintain the craft on a fixed heading, and manually operable means for varying the frequency of said oscillating signal potential to vary the heading of the craft.

2. In combination with a compass mounted on a craft, a compass card for said compass, and means for controlling the heading of the craft, an oscillation generator for producing an oscillating signal potential at a fixed frequency, a receiver for said oscillating signal potential, manually operable means for varying the frequency of said oscillating signal potential, means for varying the output potential of said receiver in accordance with said frequency variations, means responsive to the output potential variations of said receiver for operating said controlling means in accordance with movements of said manually operable means, and means operated upon relative movement between the craft and said compass card for varying the frequency of said oscillating signal potential to maintain the craft on a heading determined by said manually operable means.

3. In combination with a compass mounted on a craft, a compass card for said compass and means for controlling the heading of the craft, an oscillation generator for producing an oscillating signal potential at a fixed frequency, a receiver for said oscillating signal potential comprising a bridge detector network including a plurality of circuits having equal output potential when an oscillating signal at said fixed frequency is induced in said network, manually operable means for varying the frequency of said oscillating signal potential, means for tuning said circuits to different frequency values equal degrees greater or less than said fixed frequency whereby the output potentials thereof vary in accordance with said frequency variations, means responsive to the output potential variations of said circuits for operating said controlling means in accordance with movements of said manually operable means, and means operated upon relative movement between the craft and said compass card for varying the frequency of said oscillating signal potential to maintain the craft on a heading determined by said manually operable means.

4. A control system having a transmitter including an oscillation generator for producing an oscillating signal potential at a constant frequency value, a reactance operated by a variable value for varying the frequency of said oscillating signal potential, a receiver responsive to said oscillating signal potential, said receiver including a bridge detector network, said network having a pair of circuits each tuned to a different frequency value an equal degree greater or less than said constant frequency value, an electron discharge device included in each of said circuits, said electron discharge devices having equal output potentials when said oscillating signal potential is tuned to said constant frequency value, and the output potential of each of said electron discharge devices varying with respect to the output potential of the other electron discharge device when the frequency of said oscillating signal potential varies from said constant frequency value, an amplifying device associated with each of said electron discharge devices responsive to the output potentials thereof, a first relay device responsive to the outputs of each of said amplifying devices, and a second relay device controlled by said first relay device for controlling the direction of current flow through an electrical device in accordance with the sense of the variation of the frequency of said oscillating signal potential from said constant frequency value.

DANIEL J. HILFERTY.